United States Patent [19]
Cooper

[11] Patent Number: 5,424,780
[45] Date of Patent: Jun. 13, 1995

[54] APPARATUS AND METHOD FOR SPACIAL SCAN MODULATION OF A VIDEO DISPLAY

[76] Inventor: James C. Cooper, 1373 Sydney Dr., Sunnyvale, Calif. 94087

[21] Appl. No.: 119,610

[22] Filed: Sep. 13, 1993

Related U.S. Application Data

[63] Continuation of Ser. No. 355,461, May 22, 1989, abandoned.

[51] Int. Cl.⁶ ............................................. H04N 7/01
[52] U.S. Cl. ................................... 348/428; 348/458
[58] Field of Search ............... 348/615, 561, 581, 448, 348/443, 458, 428; 358/11; H04N 11/20, 7/01

[56] References Cited

U.S. PATENT DOCUMENTS

| | | | |
|---|---|---|---|
| 4,364,090 | 12/1982 | Wendland | 358/140 |
| 4,389,668 | 6/1983 | Favreau | 358/83 |
| 4,521,803 | 6/1985 | Gittinger | 358/12 |
| 4,533,951 | 8/1985 | Powers | 348/428 |
| 4,544,264 | 10/1985 | Bassetti | 355/14 |
| 4,544,922 | 10/1985 | Watanabe et al. | 340/728 |
| 4,573,070 | 2/1986 | Cooper | 358/37 |
| 4,620,217 | 10/1986 | Songer | 358/12 |
| 4,625,222 | 11/1986 | Bassetti | 346/160 |
| 4,661,850 | 4/1987 | Strolle | 358/11 |
| 4,673,978 | 6/1987 | Dsichert | 358/140 |
| 4,684,985 | 8/1987 | Nakagaki | 348/448 |
| 4,698,675 | 10/1987 | Casey | 358/11 |
| 4,723,163 | 2/1988 | Skinner | 358/140 |
| 4,853,970 | 8/1989 | Oh et al. | 382/54 |
| 4,941,045 | 6/1990 | Birch | 348/448 |
| 4,989,090 | 1/1991 | Campbell | 348/451 |

OTHER PUBLICATIONS

Richard J. Iredale, "High Definition Broadcast Protocal", IEEE Transaction, vol. BC-33 No. 4, Dec. 1988 FIG. 3.

Integrated Digital IDTV Receiver with Features, by Naimpally, et al. IEEE Transactions on Consumer Electronics, vol. 34, No. 3 Aug. 1988 pp. 410–419.

*Primary Examiner*—James J. Groody
*Assistant Examiner*—Chris Grant
*Attorney, Agent, or Firm*—Lightbody Law Office

[57] ABSTRACT

An apparatus and method is shown for modifying the presentation of pixels displayed or printed on a raster or matrix image or graphic display or printer, thereby increasing the apparent image quality. Means for deriving a plurality of neighboring pixels of the video signal, and means for determining pixel modification in response thereto, are also shown. Particular embodiments relating to increasing the apparent temporal and spatial resolution of raster scanned television devices are shown.

41 Claims, 6 Drawing Sheets

With Spatial Scan Modulation

N+1 WITH SPATIAL SCAN MODULATION

X MODULATION DIRECTION (S):

Up         if X✻(A+B+C)
Down       if X✻(F+G+H)
Left       if X✻(A+D+F)
Right      if X✻(C+E+H)
Upper Right if X✻(C+B✻E)
Lower Right if X✻(H+E✻G)
Lower Left  if X✻(F+G✻D)
Upper Left  if X✻(A+D✻B)

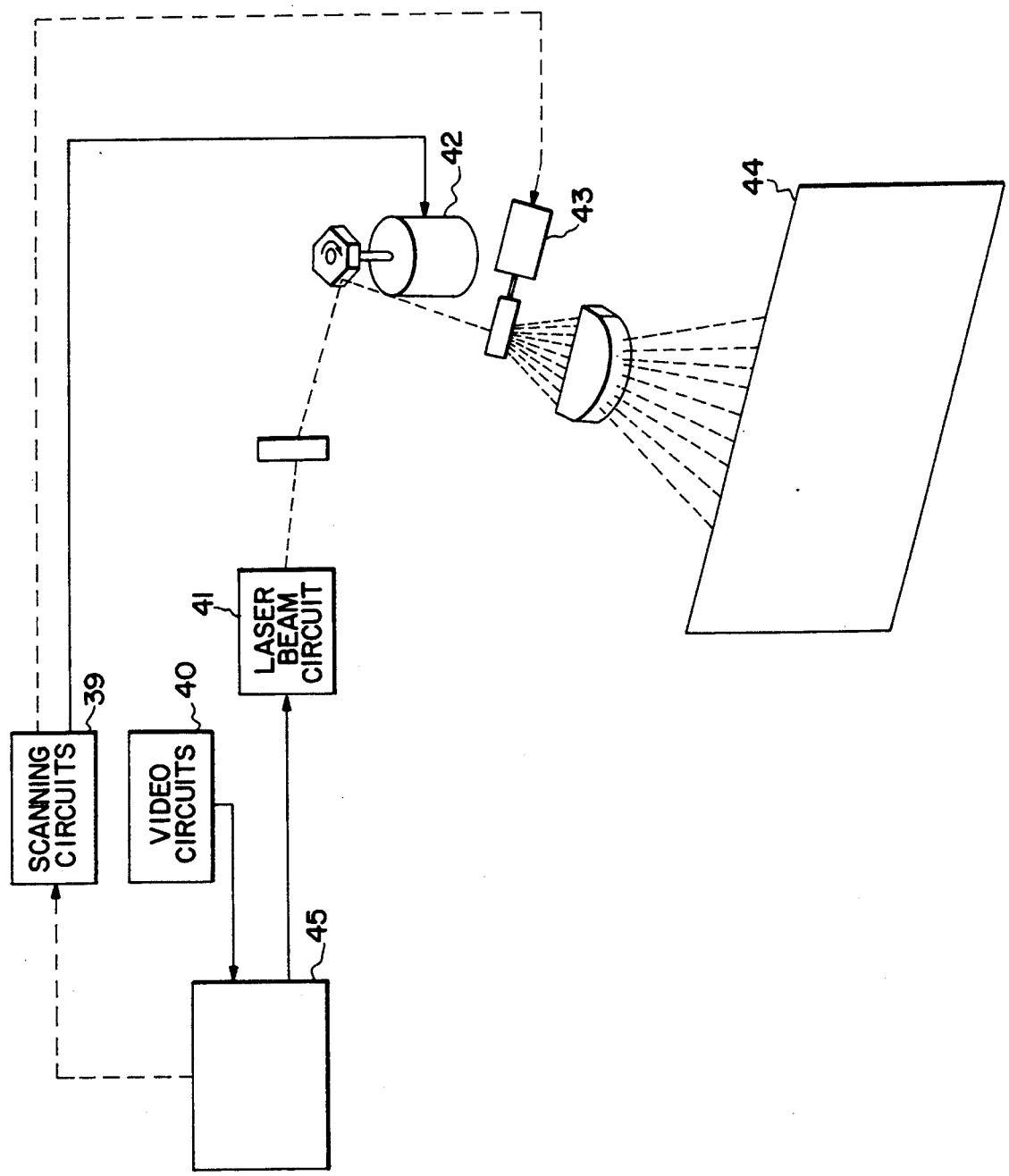

APPARATUS AND METHOD FOR SPACIAL SCAN MODULATION OF A VIDEO DISPLAY

This application is a continuation, of application No. 07/355,461, filed May 22, 1989, now abandoned.

BACKGROUND OF THE INVENTION

1. Field of the Invention

This invention relates to increasing the apparent temporal or spatial resolution of a video image which is displayed on a raster or matrix display element, without a required increase in the number of video image elements in the acquisition of the image.

2. Description of the Prior Art

As television and related image technology develops, there is increasing emphasis on improving the quality of displayed images in order that they appear more real and pleasing to the human observer. Two of the parameters which affect image quality, and therefore are subject to improvement, are spatial and temporal resolution. Spatial resolution, simply put, is the number of elements or pixels which are used to make up an image, and correspondingly, temporal resolution is the number of pixels per unit time which make up a moving image. Desirable qualities of a display system, such as broadcast television or computer graphics, will include having as many pixels per image, or frame, and as many pixels or frames per unit time as is economically feasible. Unfortunately, increasing the number of pixels per frame or the number of frames per second is a costly improvement, therefore many schemes have been developed to improve the resolution of the displayed image, while reducing the number of pixels used.

One scheme which is utilized to improve the cost to performance ratio, and is finding widespread use in consumer television receivers, involves increasing the apparent resolution of the displayed television image by replicating scan lines. The present standard U.S. television system is fixed by law and standardization to a scanning system having 525 lines, of which approximately 48 are utilized for the actual picture display. With the development of large CRT and projection displays, these 480 scan lines are often quite visible, and it is desirable to reduce this visibility. Many manufacturers effectively double the number of scanning lines displayed by repeating each scanning field of the image. This double scanning process is performed with the air of a large memory which stores the previously received scan or field, allowing in effect both the present and the previous field to be displayed line by line. One such system which accomplishes this type of improvement, is known as up scan conversion, and was used by Siemens Corp. in the 1988 time frame. Another use of scan conversion is described by Naimpally et. al. in "Integrated Digital IDTV Receiver With Features" published in IEEE Transactions on Consumer Electronics, vol. 34, No. 3, Aug. 1988. These and other scan conversion techniques provide a much more pleasing image to the viewer, even though, as one skilled in the art will recognize, the number of distinct displayed pixels is not increased. What gives rise to the perceived improvement in the image is that by displaying each scan line twice, thus filling in the void between scanning lines, a much more pleasing image results. One of the major disadvantages of these systems is the cost of the memory system which is utilized to store the previous image frame. The memory system cost can be a substantial percentage of the cost of a consumer television display. Another disadvantage is that the apparent horizontal and diagonal resolution are not increased. A diagonal line, for example, will still have a coarse stair stepped shape due to the scanning lines of the raster, even though the number of scanning lines is increased.

Other improvement systems, such as various Improved Definition Television Systems (IDTV), Advanced Television Systems (ATV), and High Definition Television Systems (HDTV) operate to increase the resolution and other quality related aspects of television systems. Many of these systems resort to various techniques for such quality improvements, some of which generate unwanted artifacts.

SUMMARY OF THE INVENTION

It is an object of this invention to provide an apparatus and method for improving the apparent quality of a displayed image by altering the size or position of the elements of the image.

It is another object of this invention to provide an apparatus and method to alter the size or position of the elements of a displayed image in response to the relationship between a plurality of elements of the image.

It is a yet further object of this invention to provide a means and method for inspecting a plurality of elements of an image to determine the presence of a need for filling of blank areas between the elements.

It is yet another object of this invention to provide a means and method for simultaneously providing a plurality of elements of said image for inspection and comparison to determine proper altering of voids between the elements; in the presence of a need thereof.

It is an additional object of this invention to provide a means and method for inspecting a central element with respect to one or more neighboring elements of an image to determine a need for changing the shape, position or size of the central element to improve it's spatial or temporal resolution relationship with the neighboring elements.

It is yet still another object of this invention to provide a means and method to improve the quality of an image by inspecting a plurality of neighboring elements to selectively generate new fill elements in response thereto.

It is still another object of this invention to provide an image display device utilizing the above objects.

According to an aspect of this invention, the inventive concepts disclosed herein show an apparatus and method for modifying the scanning and presentation of an image on a display in response to the image content of an image bearing signal, in order to display an image having apparently higher quality thus normal. The preferred embodiment of the present invention describes a neighboring pixel means for provided a plurality of neighboring pixels, and a pixel fill calculator means responsive to said plurality of neighboring pixels to provide modulation control signal which are utilized to modify the presentation of pixels of the image by a display, to selectively fill the voids, or artifacts, between pixels, in the spatial and time dimensions. The inventive concepts disclosed herein may be utilized to improve the apparent resolution of the displayed image spatially, temporally or both, and will find considerable use in the reduction of spatial or temporal (motion) artifacts of improved television systems.

The above and other objects and features of the invention will be apparent to one skilled in the art from a consideration of the following description and claims, when read in conjunction with the accompanying drawings.

BRIEF DESCRIPTION OF THE DRAWINGS

FIG. 13 shows a laser projection system utilizing an embodiment of the invention.

DESCRIPTION OF THE PREFERRED EMBODIMENTS

Figure 1:
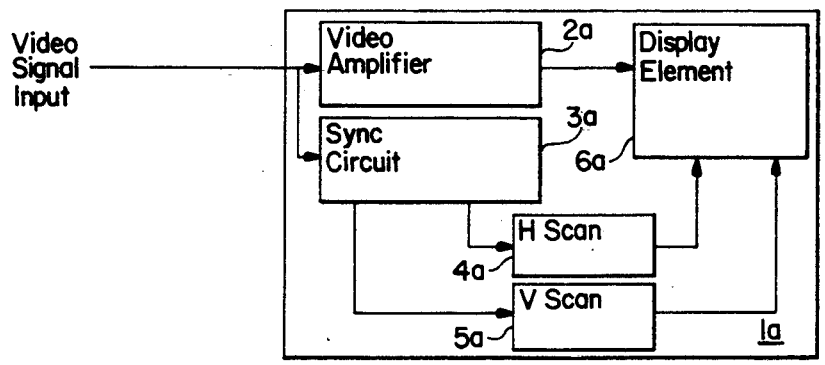
FIG. 1 is a block diagram of a typical prior art image display device.

FIG. 1 is a block diagram of a prior art image display device 1a which may be improved by the addition of the present invention. While this device may be any of those which are well known in the art, such as various matrix and raster type displays or hard copy generating display devices such as laser printer and the like. For the purpose of the present description and explanation it will be assumed that the device 1a is a raster scanned CRT display operating in a progressive (non-interlaced) mode. This device may also operate in interlaced fashion as will be apparent from the present disclosure, however for the purpose of the present explanation of the invention, by way of example, it will be assumed that it operates in a progressive mode. This device is commonly referred to as a monitor in the art. The monitor normally contains a video amp 2a which receives, clamps, amplifies and couples the video signal to the display element 6a, which is most commonly a CRT. Also contained in the monitor 1a is a sync circuit 3a which receives the video signal, strips the composite sync therefrom, separates the composite sync into H and V components and couples these components to the H scan 4a and V scan 5a circuits respectively. The scan circuits 4a and 5a provide the scanning control of the display element 6a, in this example by providing the ramp drive waveforms to the CRT yoke.

It will be recognized by one skilled in the art that the device shown by way of simple example in FIG. 1 has many practical variations which are commonly used. The single connecting lines shown between element will be understood to carry multiple signals as required, and other configurations may be made. For example, the sync circuit 3a is sometimes configured to receive one or more sync waveforms separate from the video signal. The actual scanning process may be by alternate methods as well, operating in progressive or interlaced fashion, including magnetic and electrostatic deflection of an electron beam such as a in a CRT, electro-optical or mechanical deflection of a light beam such as in a laser projector or printer, or by address or pixel selection as with flat panel or LCD type displays. One skilled in the art will however be able to utilize the present invention with any of the display devices known in the art from the description given herein, with respect to a video monitor, by way of example.

Figure 2:
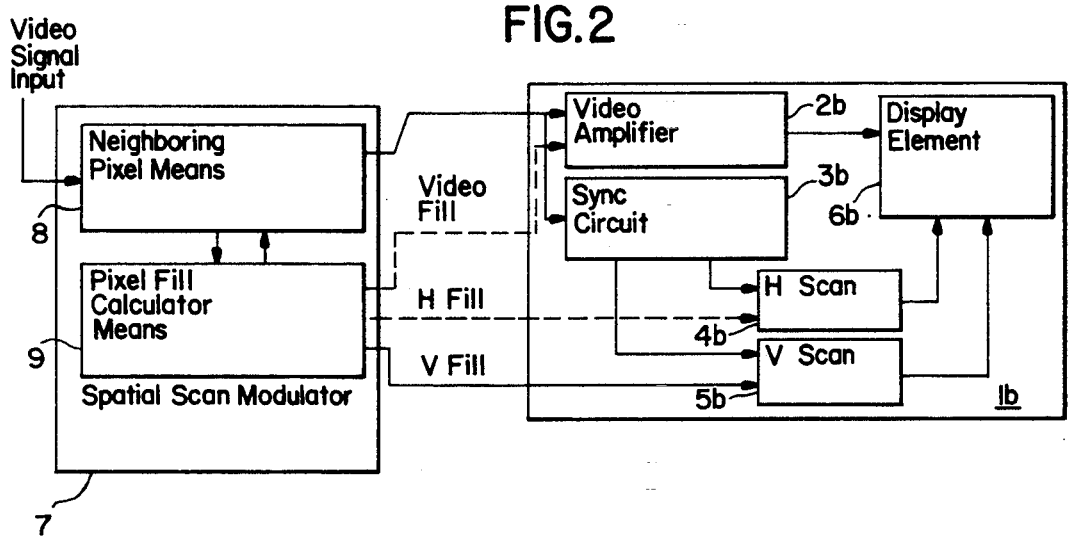
FIG. 2 is a block diagram of the device of FIG. 1 including the present invention.

FIG. 2 is a block diagram of a display device 1b like 1a of FIG. 1, including video amp 2a b corresponding to 2a, sync circuit 3b corresponding to 3a, H scan circuit 4b corresponding to 4a, V scan circuit 5b corresponding to 5a and display element 6b corresponding to 6a. FIG. 2 also shows the spatial scan modulator 7 of the present invention containing neighboring pixel means 8 responsive to the video signal to provide a plurality of neighboring pixels to the pixel fill calculator means 9. Neighboring pixel means 8 may also be responsive to pixel fill calculator means 9, as will be discussed, with respect to FIGS. 10 and 11. The neighboring pixel means also provides a delayed version of the video signal to the video amp 2b and sync circuit 3b in order to make up for processing delays as will become apparent to one skilled in the art from the discussion below. The pixel fill calculator means 9 provides a V fill signal to the V scan circuit 5b in response to the plurality of neighboring pixels from 8, in order to cause a vertical filling or dithering of the video scan at the proper times. The spatial scan modulator 7 therefore operates to determine where voids between pixels are to be filled in the image by inspection of a plurality of neighboring pixels, and causing the scan circuit of the display device to fill in or otherwise reduce the appropriate voids in response to the fill signal. Shown as optional, is an H fill signal provided by 9 and coupled to 4b to cause horizontal filling, and and optional video fill provided by 9 and coupled to 2b to cause video modulation or filling.

As with the various display devices known in the art, the fill signals provided by 9 will take on different connections to the devices 2b, 4b and 5b, resulting from the differences in those devices. It is the object of the fill signals from 9 to cause the appropriate filling of voids in the image by whatever means is suitable for the particular display device being used. Voids in the image may be filled with all or a portion of a pixel, or otherwise as will be described in greater detail later, especially with respect to FIGS. 10 and 12. In the present monitor example, the voids are filled by slightly dithering the electron beam away from its normal raster scan position by manipulation of the sweep circuits of the scan circuitry.

For the monitor device described by way of example, the V fill signal will cause the electron beam to be modulated vertically, either upward, downward or both to cause a given scan line to become wider in an upward, downward or both directions. This can be simply accomplished by adding or subtracting a small amount of high frequency pulsating current in the yoke driver circuit, thus broadening the electron beam slightly upward or downward for its normal position on the face of the CRT. Similarly, the H fill signal can cause a slight horizontal displacement of the electron beam position by adding or subracting a small amount of high frequency current from the H yoke driver circuit. In order to accomplish diagonal or angular displacement of the electron beam, a modulation of both H and V deflection circuits may be made. Such modulation of the electron beam position is relatively easy to accomplish in terms of circuitry, requiring only a bi-directional current source, or a pair on unidirectional current sources, which are switched on and off at a high frequency rate in response to the fill signals, and add or subtract current in the sweep circuit, thereby slightly modulating the current flowing in the yoke and thus altering the electron beam deflection. The operation thus causes a dither of the electron beam modulation, which will be explained in greater detail with respect to FIG. 5. The beam modulation can also be achieved by changing the focus or astigmatism of the electron beam, thereby changing the spot size and/or shape. The modulation of the electron beam may be caused to take place in other directions as well, for example in diagonal directions, in response to the pixel fill calculator means 9. Such improvements will be understood and may be made by one skilled in the art in view of the present teachings. In general the exact method of effecting the modulation of the display will be determined by the nature of the display device, however one skilled in the art will be able to devise proper circuitry to practice the present invention for a given type of display device and video signal, in view of the teachings herein. The art of changing electron beam deflection by small amounts has been previously practiced, for the purpose of geometric scan correction.

The video fill signal may be utilized to generate additional pixels in the video signal in response to 9, thus providing pixels to fill in blank areas of the image. Filling may be accomplished by simply adding the video fill signal to the video signal so that the electron beam is caused to illuminate the CRT phosphor in response to the video fill signal as well as the video signal. Illumination may be caused to occur in the absence of a video signal generated illumination, or may cause the video signal generated illumination to be modified, such as by being increased. The video fill signal may also be utilized to perform other video functions as will become apparent, such as reducing the bandwidth of the video signal, or by changing the pixel or spot size for example by defocusing the electron beam, repeating a displayed pixel, or generating a new pixel. New pixels or pixels used for filling, substitution or replacement may be comprised of all or a portion of a pixel.

Figure 3:
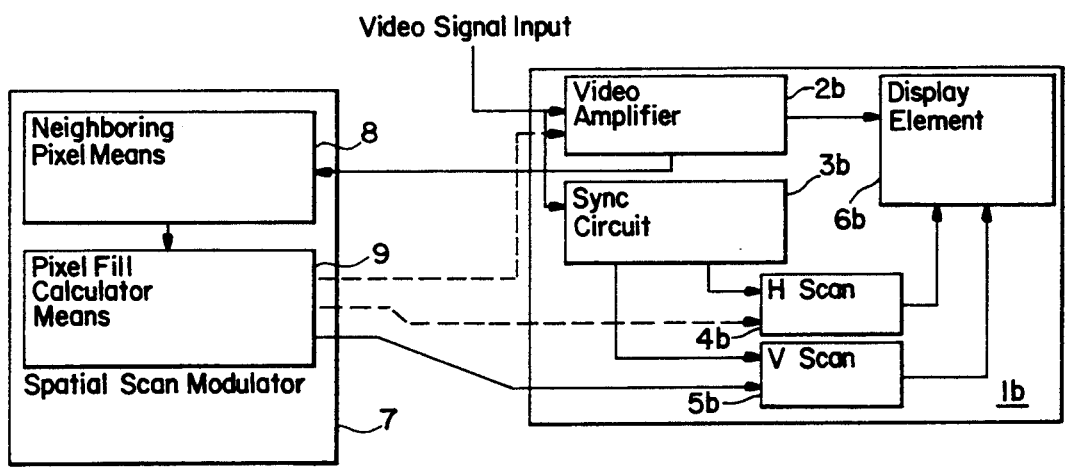
FIG. 3 shows a typical prior art raster scanned image display with a portion expanded for clarity.

FIG. 3 shows the same elements as in FIG. 2, however the neighboring pixel means 8 is coupled to video amp 2b to receive the video signal, rather than directly to the video input, as in FIG. 2. Several other embodiments relating to coupling and arrangement of elements will be possible, as will be apparent to one skilled in the art, and are intended to be considered within the scope of the invention as herein described and claimed.

Figure 4:
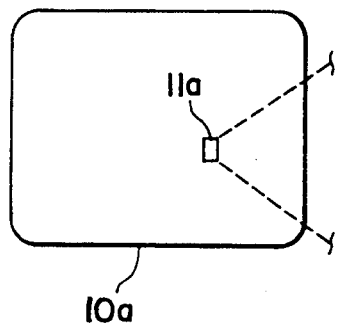
FIG. 4 shows a typical raster scanned image display as would occur without the use of the present invention, with a portion expanded for clarity.
Figure 4A:
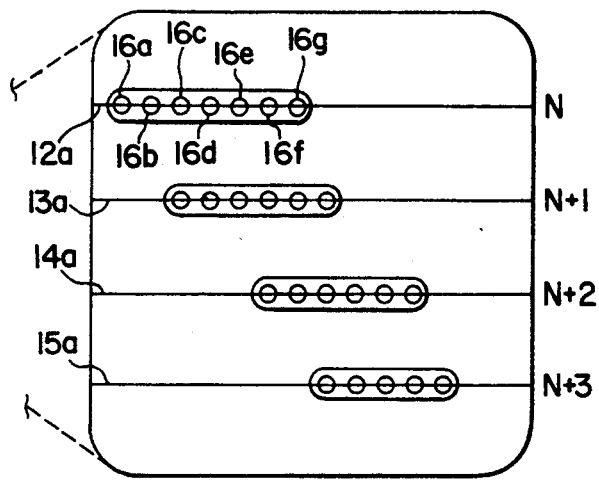

FIG. 4 shows a typical raster scanned video image 10a with a small portion 11a which is expanded for clarity. The small portion 11a shows four scan lines 12a, 13a and 15a. The scan lines may be considered consecutive for the purpose of the present explanation, but may also be alternate as in an interlaced display, or otherwise non-consecutive. The scan lines are shown thicker during the higher illuminated portion, the thickness representing the width of the electron beam, with the narrow line representing the scan track normally followed by the beam, as is common for CRTs. Scan line 12a has seven illuminated pixel points 16a through 16g identified for clarity. As with many systems, the individual pixels blend together when sequentially aligned during a scan line, due to both the width of the electron beam, and the limited bandwidth of the video amplifiers in the monitor, giving rise to the continuous highlighted areas shown. The four scan lines show a diagonal bright areas which can be seen to take on a rather stair stepped appearance. The stair stepping and the space between the scanning lines make up picture artifacts that viewers find objectional in viewing the image. It is the object of the present invention to fill in the voids of the stair stepping and voids between consecutive scanning lines, by modulating the scanning of the electron beam, thus reducing these objectional artifacts.

Figure 5:
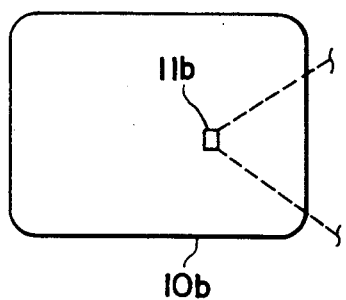
FIG. 5 shows a detailed diagram of a given scan line of an image in prior art form and in improved form resulting from the present invention.
Figure 5A:
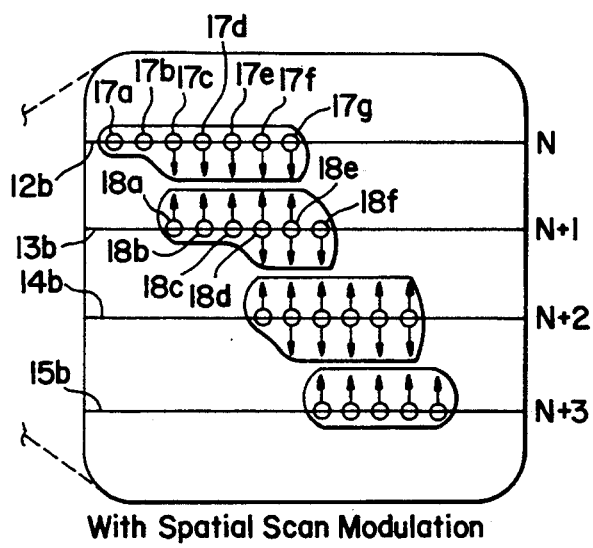

FIG. 5 shows the same raster display 10b as 10a in FIG. 4, with expanded portion 11b corresponding to 11a, and showing scan lines 12b, 13b, 14b, and 15b corresponding to 12a, 13a, 14a, and 15a respectively. Illuminated pixels 17a-g corresponding to 16a-g are shown as well as illuminated pixels 18a-f. For each pixel which is to be spatially modulated, as up or down arrow is shown indicating the direction(s) of modulation. For example, pixel 17b is modulated downward to fill the void between 17b and 18a. Likewise pixels 17c-g are all modulated downward. Pixels 18a and 18b are modulated upward to fill the same void and 18c-f are modulated both upward an downward. One skilled in the art will recognize that the image of FIG. 5 has a higher apparent resolution than that of FIG. 4, the improvement being a result of the filling of voids. With respect to FIG. 2, when pixel 18a is being scanned, the neighboring pixel means 8 would provide the pixels adjacent to 18a, including 17b, 17c, 17d, and 18b, for inspection by pixel fill calculator means 9. The pixel fill calculator 9 will determine that there is a void between 17c and 18a which should be filled, thus causing 18a to be modulated upward into the void. It can be seen from inspection of FIG. 5 that a good portion of the voids between scanning lines, as well as a portion of the stair stepped edge void have been filled in.

Figure 6A:
FIG. 6 shows a group of nine neighboring image elements which may be operated on by the present invention.
Figure 6B:
Figure 6C:
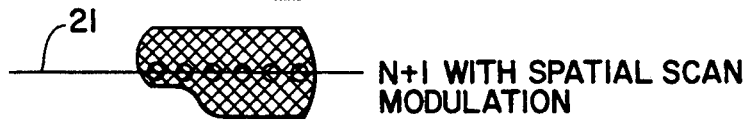

FIG. 6 shows a typical prior art scan line 19, corresponding to 13a of FIG. 4, having an illuminated section of 6 pixels shows as a wider portion of the line. As with the previous example of FIGS. 4 and 5, the individual pixels have blended together giving a continuous illuminated section. The scan line 20 shows the same line as 19, except that it has been spatially modulated in accordance with the present invention thus corresponding to 13b of FIG. 5. The track of the electron beam is shown in 20 as a sinusoidal path, or spatial modulation, which deviates from the straight scanning line of the prior art. Note that for the left two pixels the deviation occurs only above the line, whereas for the remaining 4 pixels the deviation takes place both above and below the line. In the preferred embodiment of the invention the electron beam path is such that the track pitch, that is the spacing between the points where the track crosses the normal scan line, is less than the electron beam width, therefore the electron beam will illuminate a solid area. The illuminated area created by the electron beam path shown in 20 is shown as a solid area in 21.

A note should be made about the relative brightness of the spatially modulated scan of 21 versus the area of the prior art scan 19. The brightness of a given area is a function of the flux density of the electron beam striking that area, that is a given number of electrons will tend to provide a given number of photons of light, independent of the area which it strikes. For a given electron beam intensity, the area of 21 will therefore appear dimmer in terms of photons per unit area, than the area of 19. If a given spatial scan modulated area of the image is large enough to be resolved as a distinct element, the viewer may notice this decreased intensity. In order to overcome this decreased brightness, it will be desirable to increase the electron beam intensity, therefore restoring proper brightness, in those areas where the spatial modulation is occurring. The brightness increase will be a function of the amount of modulation. For example while the electron beam is modulated only upward for the left two pixels of 20, a first given increase should be made, and for the remaining pixels where the beam is modulated both up and down, a second, higher, increase should be made. This increase in electron beam intensity can be made in response to the pixel fill calculator means 9 shown in FIG. 2, via the video fill signal. It may also be desirable to utilize the video fill signal to increase the number of illuminated pixels, in conjunction with the spatial scan modulation. For example, the illuminated area of line 20 (13b of FIG. 5) can be turned on one pixel early in order to further reduce the stair stepping of the diagonal edge.

Figure 7:
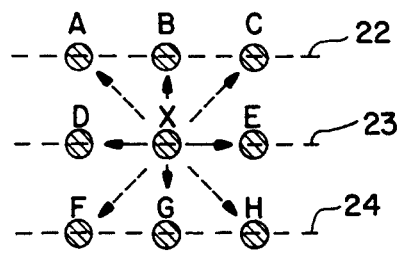
FIG. 7 shows a block diagram of the present invention including the use of a ranking means.

FIG. 7 shows a group of 9 pixels which are located on 3 scan lines of a raster. These nine pixels may be utilized by a pixel fill calculator in order to determine if spatial scan modulation should be enabled. It will be assumed for the purpose of the present example, that pixel X, in the center of the 9 pixel's, is the pixel currently being displayed by the display element, in this example a CRT. Scanning will be assumed to be from left to right, top to bottom. Pixels A-D will have occurred in time before X, and pixels E-H occur in time after X. The 9 pixels are all made simultaneously available to the pixel fill calculator by the neighboring pixel means (8 of FIG. 2). The neighboring pixel means in the preferred embodiment is made up of delay lines, shift registers or other delay devices which are well known to one skilled in the art, which allow all nine of the pixels to be present simultaneously. A similar device which can be utilized for the neighboring pixel means function is described, with respect to FIGS. 9 and 10, in U.S. Pat. No. 4,573,070 issued Feb. 25, 1986. Other arrangements and circuits to perform this function will be apparent to one skilled in the art from the present disclosure. In order that pixel X can be the currently displayed pixel, it is necessary that the neighboring pixel means make it available to the display device, which is shown by the connection from 8 to 2b and 3b of FIG. 2, which replaces the video input to the display device.

FIG. 7 shows eight possible directions of spatially modulating pixel X which are represented by eight arrows, however X may well be modulated in any direction, including those of the third dimension, which would represent a frame to frame, or time direction. Modulation in the time dimension is useful in improving motion artifacts. Time modulation is accomplished by using delays of one picture period (field or frame) or more to provide pixels in the time axis, which may be used to fill temporal voids. Pixel X is then intensity modulated in response to pixels which are present in fields or frames other than the one containing X. U.S. Pat. No. 4,573,070 which is incorporated herein by reference, describes more fully various embodiments of neighboring pixel means suitable for use in this fashion.

For the purpose of the present description for the purpose of explanation, it will be assumed that only the two dimensions, and the scan modulation directions indicated by the 8 arrows, are to be considered. It will also be assumed that the pixels are binary, i.e. that they are either illuminated or off, such as in a computer character display.

A group of easily implemented logic operations may be utilized to determine which if any of the 8 spatial scan modulation directions should be enabled for a given pixel X having a certain binary illumination status.

Logic operations may be used to enable the modulations according to the following table:

| MODULATION DIRECTION | CONDITION |
| --- | --- |
| UP IF | $X \cdot (A + B + C)$ |
| DOWN IF | $X \cdot (F + G + H)$ |
| LEFT IF | $X \cdot (A + D + F)$ |
| RIGHT IF | $X \cdot (C + E + H)$ |
| UPPER RIGHT IF | $X \cdot (C + B \cdot E)$ |
| LOWER RIGHT IF | $X \cdot (H + E \cdot G)$ |
| LOWER LEFT IF | $X \cdot (F + G \cdot D)$ |
| UPPER LEFT IF | $X \cdot (A + D \cdot B)$ |

For example, if pixel X and one of pixels A or B or C are present with the same binary illumination status as pixel X then the up direction spatial modulation will be enabled, to fill the void which exists between pixel X and B. If pixel B is present with the same binary illumination status as pixel X, this modulation will operate to fill the space between the scan lines. If pixel B is not present with the same binary illumination status as pixel X, but pixel A or C is present with the same binary illustration status as pixel X, the modulation will operate to fill in the diagonal edge.

The above logic operations assume that the pixels are either on or off providing non-background information, as in a computer character display CRT, and accordingly binary logic based on the binary illumination status of the pixels may be utilized to make the determination of modulation direction. When the invention is utilized with image video, i.e. that having shades of gray or color information, it is necessary to first determine if the neighboring pixels are related to pixel X before carrying out the above logic operation. For example if pixel X is a blue pixel, and pixel A is a red pixel, it would not be desirable to fill the void between pixel X and pixel A with blue fill, since these are distinct elements of the image, and should not be merged together. Simplistically stated then, the invention will operate to first determine which of the neighboring pixels are related to pixel X, in this example whcih of the neighboring pixels are blue. Blue pixels are caused to fill the blue areas and red pixels are caused to fill the red areas. The related pixels are then inspected according to the above logic table to determine which modulation directions, if any, are to be enabled.

Figure 8:
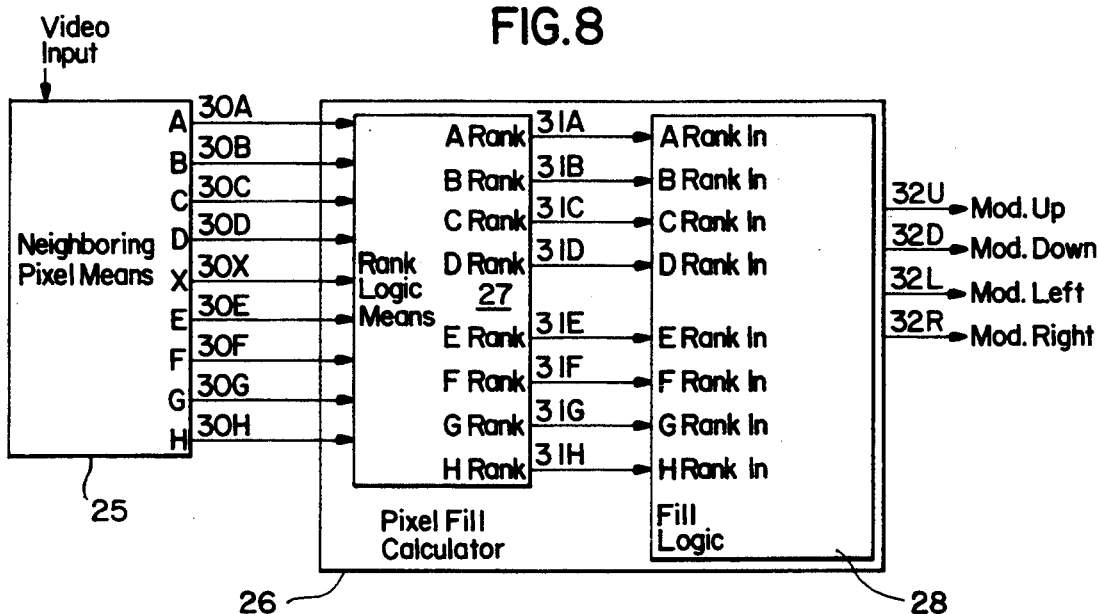
FIG. 8 shows a diagram of pixel arrangement which would result from a temporally operating embodiment of the invention.

FIG. 8 shows an embodiment of the present invention which is to be utilized with image video. The FIG. 8 embodiment contains a neighboring pixel means 25 similar to 8 of FIG. 2, and a pixel fill calculator means 26 similar to 9 of FIG. 2. The pixel fill calculator 26 contains a rank logic means 27, and a fill logic means 28 which cooperate to inspect the 9 neighboring pixels A-H and X presented on lines 30A-H and X respectively and provide modulate up, down, left and right signals on lines 32U, 32D, 32L, and 32R respectively, which operate to control the spatial modulation of pixel X. It should be noted that in FIG. 8 the diagonal modulation lines have been omitted for clarity, and further that the connection which provides pixel X to the display device as well as the video fill connection to the video amp are not shown for clarity. One skilled in the art will however recognize the need for, and be able to provide the proper coupling of, pixel X and video fill functions to the display device. As will be apparent from the present teachings, many of the functions of the present invention can be implemented with various forms of hardware and software. For example, microprocessors with suitable software may be utilized. As a further example, a read only memory may be utilized. In particular, a ROM would be well suited to implement part or all of the pixel fill calculator means 26.

The process of determining which neighboring pixels are related to pixel X is a ranking process, which is described in detail in the aforementioned U.S. Pat. No. 4,573,070. The ranking circuitry shown in FIGS. 15 and 16 of the U.S. Pat. No. '070 can be utilized for the rank logic means 27 of FIG. 8 of the present invention. The rank logic means 27 operates in response to the pixels A-H and X provided via 30A-H and 30X to determine each of pixel A-H's relative closeness to pixel X. For example if pixel C were determined to be the closest pixel to X, then a 0 signifying a rank of 0 (that no other pixels are closer to X) would be output on line 31C. If 2 other pixels were closer to X than pixel A, a 2 would be output on line 31A. Each pixel A-H will be ranked by 27, with that pixels respective rank provided on line 31A-H. The fill logic means operates to select a given number, for example 3 of those pixels closest to X and identifies them as being present. The logic equations given above for the example of FIG. 7 are then used to determine the modulation directions to be enabled.

As an example, assume that the pixels have the following ranks:

A=0
B=1
C=7
D=2
E=6
F=5
G=4
H=3

From the above chart it can be seen that pixels A, B and D are closest to pixel X. The three closest pixels will be identified as A, B and D, and of the above logic equations the following will be satisfied:

X·(A+B+C) Modulate up
X·(A+D+F) Modulate left
X·(A+D·B) Modulate upper left

These equations being satisfied, the modulate up signal 32U, and modulate left signal 32L will be activated. The modulate upper left signal would be also activated, if provided. As a result of the above analysis, the void between pixels A, B, D and X would be caused to be filled by spatial modulation of pixel X. As an improvement to the spatial modulation, the amplitude or spatial intensity of the modulation may be changed in response to the ranking of the neighboring pixels. For example, if the difference between X and A is small, a large amplitude of modulation is used; and if the difference were large, a small modulation used. The amount of modulation is therefore caused to vary in response to the difference, in either spatial or temporal embodiments. Of course, intensity modulation may also be provided as well, as previously discussed.

Figure 9:
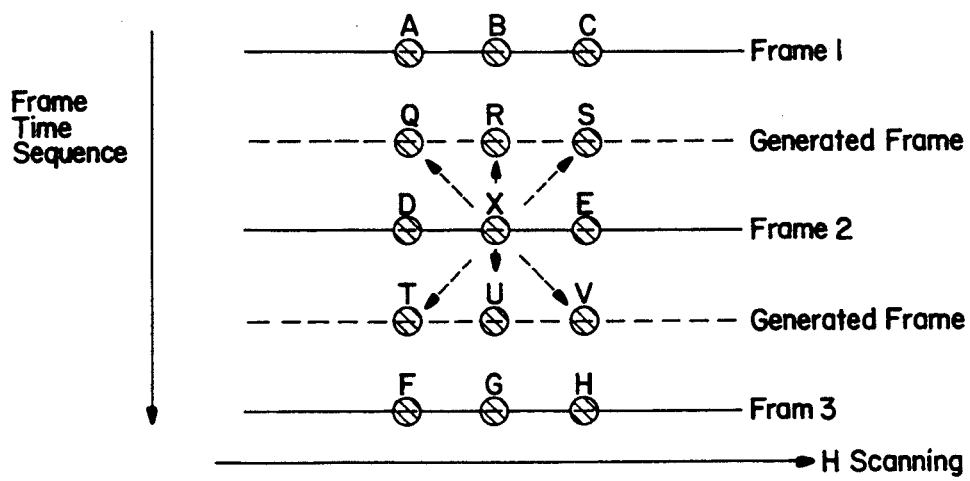
FIG. 9 shows a diagram of 15 pixels taken from a given scan line of 5 video frames.

FIG. 9 shows a pixel configuration which results from one temporal embodiment of the present invention. From the above description it can be seen that it will be relatively easy to configure the invention to operate in time to generate new scan lines or new fields of video. Such a configuration may be envisioned by assuming that pixels A, B and C are from a first frame, D, X and E from a second frame (or scan line), and pixels F, G and H from a third frame (or scan line). Intermediate frames, fields or scan lines can then be generated between the first and second and between the second and third. Such a system is shown in FIG. 9 where pixels A-H and X are taken from the incoming video signal and pixels Q, R, S, T, U and V are fill or synthesized pixels which are generated in response to the operation of the pixel fill calculator. In the present example, pixel Q would represent a upper left modulation, pixel R an up modulation, pixel S an upper right modulation, pixel T a lower left modulation, pixel U a down modulation, and pixel V a lower right modulation. The new pixels Q-V would be the value of pixel X, which is stored in a field or other memory matrix and displayed in the proper time sequence on the display element. Alternately, the new pixel could be a calculated value derived from a plurality of the pixels A-H and X, as will be discussed with respect to FIG. 12. For example, pixel R could be arrived at by an average of pixels X and B, or a combination of pixels A, B, C and X.

Figure 10:
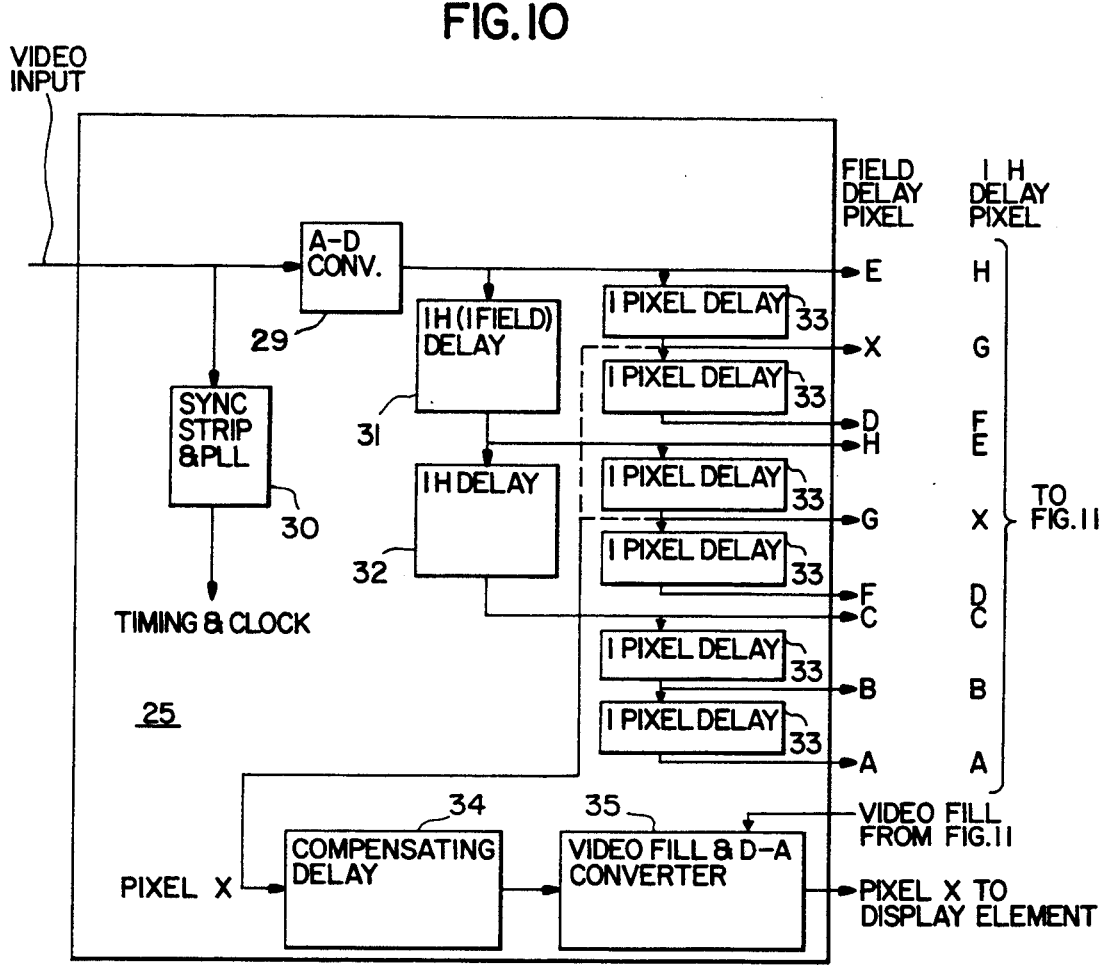
FIG. 10 shows a detailed diagram of an embodiment of a neighboring pixel means.

FIG. 10 shows the preferred embodiment of the neighboring pixel 25 means of FIG. 8 in greater detail. Input video is coupled to an A-D converter 29 where it is digitized and output as a digital video data stream. The input video is also coupled to a sync stripper and PLL circuit 30, which provides all of the required clock and timing signals for the elements of 25 and also the circuit of FIG. 11. The connection of the various clock and timing signals are not shown here for clarity. The A-D converter 29, and sync stripper and PLL 30 are well known in the art, and are commonly found in such devices as timebase correctors and other video processing devices. One skilled in the art will be able to utilize any of a number of well known circuits and I.C.s to implement 29 and 30. For example, the AD9502 Hybrid Video Digitizer, provided by Analog Devices of Norwood, Mass., provides all of the PLL and digitizing functions of 29 and 30. The digitized video is output at a fixed number of samples per line depending on the particular version of the AD9502. Digital Delays 31, 32 and 33 are coupled to the digital video output from 29 in order to provide a plurality, in this example 9, of delayed versions of the digital video signal. 1 H delay I.C.s, suitable for 31 and 32, are available, such as the N.E.C. μPD41101, and 1 field delay I.C.s suitable for 31, are also available, such as the N.E.C. μPD41221. Application notes on the use of these I.C.s are available from N.E.C. Electronics Inc. in Mountain View, Calif. A 1 pixel delay I.C. suitable for 33 is the 74HCT374 Octal Latch, available from multiple sources. At any instant, nine different pixels will then be present at the output.

Referring to FIG. 7, one skilled in the art will note that if delays 31 and 32 are 1 scan line (1H) and delays 33 are 1 pixel each, then the pixels labeled A-H and X in FIG. 7 will be present at the right side output of 25. In this example, the display of FIG. 7 is assumed to be either a progressive display, or an interlaced display without the second field shown.

Assuming, for another example, that FIG. 7 shows scan lines 22 and 24 from an earlier field of interlaced scanning, and line 23 is from a present field of scanning, one skilled in the art will recognize that if delay 31 is one field, the output from 25 will correspond to the pixels depicted in FIG. 7.

One skilled in the art will realize that the one field delay 31 will be required to make available at H, the previous field scanning lines above the present field scanning line available at E. It should be noted that in many interlaced systems, the actual length of the delay will vary be one line from field to field, depending on whether the even or odd field is being delayed. In the use of the N.E.C. µPD41221 I.C., the proper alignment of input and delayed video is simply accomplished by use of the increment (INC) and decrement (DEC) controls. One skilled in the art will however, be able to construct such a delay, as is well known in the art.

In order to make pixel X available in analog form for use by the display element, as shown in FIG. 2, digital pixel X is delayed by a compensating delay 34, and then coupled to a digital to analog converter and video fill circuit 35, where it is converted to an analog signal. The N.E.C. µPD41101, or a combination of 74LS374 I.C.'s, can be used for 34. The Analog Device's HDG-0805 Hybrid Video D-A is a suitable part for the D-A function of 35. In addition, the HDG-0805 has a 10% bright control which increases the video signal level by 10%. This 10% bright control may be coupled to the video fill signal from the pixel fill calculator. Alternatively, a separate video gain circuit may be utilized to control the video fill signal. Such gain circuits are well known in the art. In the preferred embodiment, the analog pixel X may be coupled directly to the CRT. The D-A converter is also caused to vary the intensity of analog pixel X in response to a video fill signal coupled from the fill logic circuit 28 of FIG. 11. The purpose of the compensating delay 34 is to ensure that pixel X is delayed by the proper time with respect to the pixel fill calculator generation of fill signals. The compensating delay may also be used in a temporal embodiment of the present invention to provide pixel X at the proper time (i.e. to place pixel X in the proper location in the displayed pixel sequence) for display in response to the pixel fill calculator means. One skilled in the art will recognize that it will be possible to combine delay 34 with delays 31–33 which provide the neighboring pixels. For example, if 34 is to have a delay of 1 pixel, then pixel D can be coupled directly to 35, eliminating 34.

Figure 11:
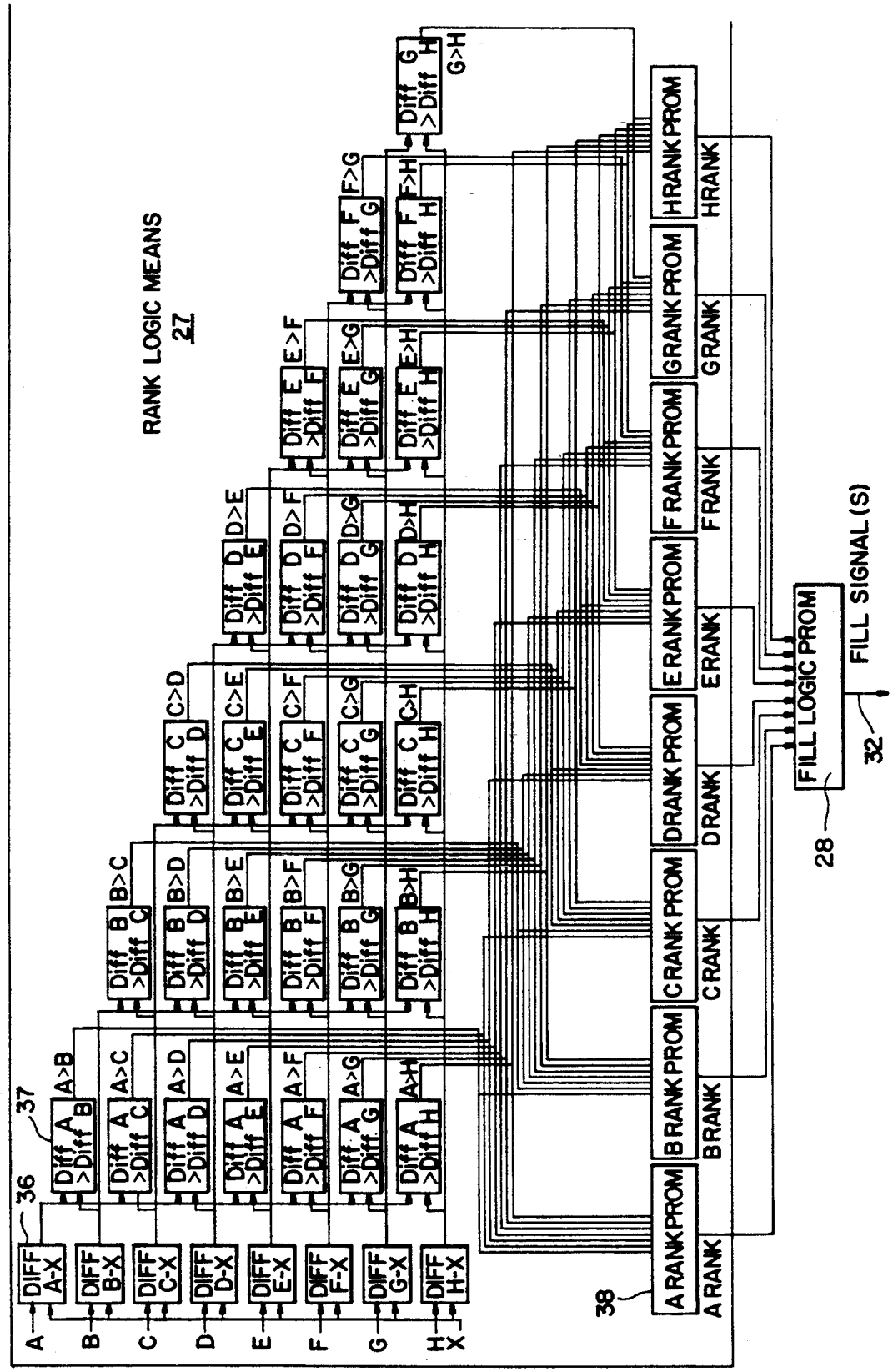
FIG. 11 shows a detailed diagram of an embodiment of a pixel calculator means.

FIG. 11 shows the preferred embodiment of 26, the pixel fill calculator means, of FIG. 8. The rank logic means 27 of FIG. 11 receives pixel A-H and X from the neighboring pixel means 25 of FIG. 10. Each pixel A-H is compared to pixel X to determine the relative difference by a difference determining circuit 36. Each difference is then compared to all of the other differences by a difference comparison circuit 37. For the 9 pixels A-H and X there are then 8 difference determining circuits 36 and 28 difference comparison circuits 37. The 7 outputs of the difference comparison circuits which are responsive to a given pixel's difference comparisons are coupled to an individual ranking circuit 38, which in the preferred embodiment is chosen to be a small PROM. The PROM outputs a binary number which corresponds to the number of other differences a given difference is larger than. For example, if pixel A's difference is larger than 3 other differences, the output of the A rank PROM would be 3.

The rank values from each ranking PROM are coupled to the fill logic circuit 28, which in the preferred embodiment is make up of PROM I.C.s. The fill logic circuit 28 generates the previously discussed fill signals in response to the 8 rank values. The fill signals are then coupled to the video fill circuit of 35 in FIG. 10, as well as the display element, as previously described.

Figure 12:
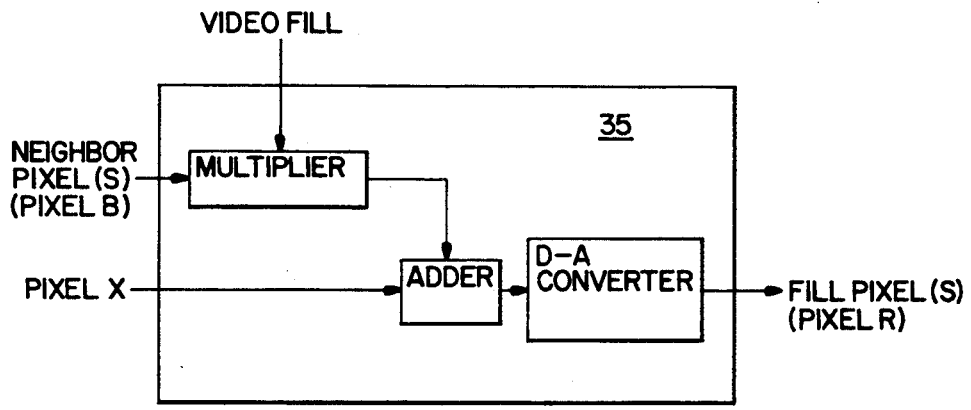
FIG. 12 shows an alternate embodiment of video fill and D-A converter 35.

FIG. 12 shows an alternate embodiment of the video fill and D-A converter 35 of FIG. 10 in applications depicted by FIG. 9. The function of the preferred embodiment of FIG. 12 is to generate a fill pixel (for example B) which is similar or equivalent to pixel X, assuming a pixel R is desired, if pixel B is very different from X as indicated by its high rank, otherwise as pixel B's rank decreases, indicating a smaller difference between B and X, a combination of a plurality of pixels, for example, an average of B and X is utilized for the fill pixel. This embodiment of FIG. 12 generates a fill pixel, such as pixel R of FIG. 9, in response to the video fill signal from FIG. 11. The fill pixel R is a combination of a plurality of pixels, in this example pixels X and B. The fill pixel, assuming one is generated, is caused to be only pixel X, or a combination of X and B in response to the video fill signal. The embodiment of FIG. 12 operates to generate a portion of pixel B in response to the video fill signal, and combine that portion with pixel X in the adder. The combination is then converted to analog by the D-A converter. Alternatively, a portion of pixel X could also be generated by a second multiplier (not shown), in response to the video fill signal, with the two portions combined. Such a two portion combination is frequently used in video noise reduction devices such as that shown in U.S. Pat. No. 4,064,530 by Kaiser and U.S. Pat. No. 4,107,736 by Lowrey. Various other types of combinations and weighted averages can also be utilized for this combination, including the use of more than two pixels in the combination to generate the fill pixel.

While the above preferred embodiment of the invention has been described by way of example, many other embodiments may be utilized to operate in a given video system. For example the invention may be utilized with interlaced scanning systems, or with multiple channel displays such as RGB color displays. A matrix of less or more than the suggested 9 pixels may be utilized, which picture elements may be adjacent or non-adjacent, and may be symmetrically or non-symmetrically chosen. To one skilled in the art in will be apparent from the present teachings that there are numerous variations, configurations and embodiments of the above described invention which variations may be tailored into a specific embodiment to maximize effectiveness with a particular display device and video system without departing from the spirit and scope of the invention as hereinafter claimed.

What is claimed is:

1. Apparatus for improving the apparent resolution of an image displayed by a display device, the image made up of a number of image elements, including in combination, a neighboring pixel means responsive to a signal which carries said image to provide a plurality of image elements, and a fill calculator means responsive to said plurality of image elements to generate a fill signal indicating where said display device may alter voids between said image elements improving the apparent resolution of the image without requiring an increase in the number of image elements originally making up the image.

2. Apparatus as claimed in claim 1 wherein said signal is a video signal, and said neighboring pixel means operates to delay said video signal thereby providing said plurality of image elements.

3. Apparatus as claimed in claim 2 wherein said fill calculator means operates to compare a first image element of said plurality of image elements to one or more neighboring elements of said plurality of image elements to determine if a void between any of said neighboring elements is to be altered.

4. Apparatus as claimed in claim 3 wherein said fill calculator means operates to compare said first image element to a plurality of said neighboring elements.

5. Apparatus as claimed in claim 3 wherein said fill calculator means operates to compare said first image element to a plurality of said neighboring elements to dertermine the relative differences between said first image element and each of said plurality of said neighboring elements, said fill calculator means further operating to rank said plurality of said neighboring elements, according to their respective relative differences.

6. Apparatus as in claim 1 wherein said fill signal is responsive to the difference between a first image element and a neighboring image element of said plurality of image elements.

7. Apparatus as in claim 6 wherein said fill signal has a value, which value is responsive to said difference.

8. Apparatus for improving the image quality of a displayed image, the image made up of a number of image elements carried by a signal, the apparatus including in combination a neighboring pixel means responsive to the signal carrying said displayed image to provide a plurality of image elements including a central pixel and a plurality of neighboring pixels and a fill calculator means responsive to said central and neighboring pixels to generate a fill signal indicating voids in said displayed image which may be filled, which said displayed image is displayed by a display device thereby improving the apparent resolution of the image without requiring an increase in the number of image elements originally making up the image.

9. Apparatus as claimed in claim 8 wherein said signal is a video signal and said neighboring pixel means operates to delay said video signal thereby providing said neighboring pixels, and said fill calculator means operates according to logical equations to generate said fill signal.

10. Apparatus as claimed in claim 8 wherein said fill calculator means operates to compare said central pixel to said neighboring pixels to determine relative differences thereof, and to rank at least some pixels from the group of said pixels which are compared according to their respective relative differences.

11. An improvement for a scan device for displaying an image carried on a video signal, the image made up of a number of image elements, the improvement including in combination a neighboring pixel means responsive to said video signal to provide image elements including a central pixel and at least one neighboring pixel, a fill calculator means responsive to said central and neighboring pixels to determine the location of areas of said image being void between image elements and generating a fill signal operative to cause said scan device to perform spatial altering of the display of said central pixel to fill the voids thereby improving the apparent resolution of the image without requiring an increase in the number of image elements originally making up the image.

12. The improvement of claim 11 wherein said fill signal causes the scanning of said scanned device to deviate from the normal scanning location for said central pixel thereby causing said central pixel to be displayed in said fill areas of said image.

13. The improvement of claim 12 wherein said scanned device contains a CRT and said fill signal causes a position of the electron beam to be spatially modulated on the face of said CRT thereby causing said central pixel to be displayed in a larger than normal area.

14. The device or apparatus of claim 1, 2, 3, 4, 5, 6, 7, 8, 9, 10, 11, 12 or 13 said device or apparatus including a scanning beam wherein the scanning of said beam is altered in response to some or all of said image elements of said signal carrying said image in order that areas of said displayed image, which would otherwise not be scanned, may be caused to be scanned in order to increase the apparent quality of said displayed image.

15. A method of improving the quality of an image which may be displayed on an image display device, the image made up of a number of image elements, including the step of selecting a plurality of pixels of said image, the step of comparing a first of said selected pixels to at least a second of said selected pixels to select voids of said image to be altered and including the further step of altering voids in said image in response to said comparing step thereby improving the apparent resolution of the image without requiring an increase in the number of image elements originally making up the image.

16. The method of claim 15 wherein said altering step includes filling said voids with all or a portion of a pixel.

17. The method of claim 15 wherein said altering step includes filling said voids with a combination of a plurality of pixels.

18. The method of claim 17 wherein said combination of a plurality of pixels may include all or none of said compared pixels.

19. A method of modifying a video signal representing an image, the image made up of a number of image elements, said modification enhancing the display of said image by a display apparatus which display includes scanning a raster, said video signal including lines of video corresponding to raster lines with said lines of video including elements, said method including the steps of:

storing in temporary storage means a known number of said elements from a known number of said lines of video to form a set of said elements said set of elements including elements having binary illumination conditions such as in a computer display;

identifying a central element from the central area of said set of elements which central element is one of said set of elements;

generating a modification signal in response to said set of elements said modification signal responsive to said central element and other said elements which are part of said set of elements to indicate when said central element is in a binary illumination state and is adjacent to one or more elements in another binary illumination state; and modifying said central element before the display thereof in response to said modification signal to change the value of said central element to a value being in one or the other binary illumination state elements thereby improving the apparent resolution of the image without requiring an increase in the number of image elements originally making up the image.

20. A method of enhancing the display of an image by a display apparatus, the image made up of a number of image elements, which display includes scanning a raster, said raster including raster lines, said raster lines including elements which include elements having binary illumination conditions such as in a computer display, said method including the steps of:
storing in temporary storage means a known number of said elements of a known number of said raster lines to form a set of said elements;
generating a central element representative of the central area of said set of elements;
generating a modification signal in response to said set of elements; and
modifying the display of said central element in response to said modification signal to improve its spatial resolution relationship with its neighboring elements thereby improving the apparent resolution of the image without requiring an increase in the number of image elements originally making up the image.

21. A method as claimed in claim 19 or 20, wherein the step of modifying includes changing the size of said central element to more closely match ones of said elements of said set of elements.

22. A method as claimed in claim 19 or 20, wherein the step of modifying includes reducing the size of said central element to display a portion thereof.

23. A method as claimed in claim 19 or 20, wherein the step of modifying includes changing the relative position of the display of said central element by altering the scanning thereof in response to said modification signal.

24. A method as claimed in claim 19 or 20, wherein the step of modifying includes changing the value of said central element to more closely match the values of some of said elements of said set of elements.

25. A method as claimed in claim 19 or 20, wherein the value of said central element is changed to a value between the values of two of said elements of said set.

26. A method for improving the apparent resolution of an image, said method comprising examining a central element and one or more neighboring elements in order to determine the relationship therebetween,
said central element and said neighboring element having blank areas therebetween containing no substantive information, altering the size or shape of said central element in order to provide information for the blank areas between said central and neighboring elements, thus improving the apparent resolution of the image.

27. The method of claim 26 wherein the change in central element size or shape is accompanied by increasing the brightness of the beam creating such central element.

28. The method of claim 26 wherein the change in size or shape of said central element is accomplished by filling or dithering the scan that creates said central element at the appropriate time.

29. The method of claim 26 characterized in that the analysis of the relationship between the central element and said neighboring element develops a fill signal, which said central element having its size or shape modified in accord with such fill signal.

30. The method of claim 29 wherein said fill signal is added to the signal for said central element such that said central element is illuminated in response to both said central element signal and said fill signal.

31. The method of claim 26 wherein the image is a computer character displayable on a CRT.

32. An apparatus for improving the apparent resolution of an image having a central element and one or more neighboring elements, there being blank areas therebetween,
said apparatus including a means for determining the relationship between a central element and a neighboring element, and changing the size or shape of at least one element in response to said relationship so as to fill in the blank area between such central element and neighboring element.

33. The apparatus of claim 32 wherein said relationship between said central element and said neighboring element is utilized to develop a fill signal, with said at least one element being modified in accord to such fill signal.

34. The apparatus of claim 32 wherein the size or shape of said at least one element is altered by modifying the signal illumination for such element.

35. The apparatus of claim 34 characterized in that signal illumination is modified by adding the fill signal to the signal of said at least one element.

36. The apparatus of claim 34 wherein the elements are generated by a scan and wherein the signal illumination signal is modified by filling or dithering the scan at the appropriate time so as to alter the size or shape of said at least one element.

37. The apparatus of claim 36 characterized in that said at least one element includes the central element.

38. The apparatus of claim 37 characterized in that said at least one element includes a neighboring element.

39. The apparatus of claim 32 wherein such image is a computerized character display.

40. An apparatus for improving the apparent resolution of a scanned image having a central and neighboring elements developed by a signal, there being blank areas between such elements, said apparatus comprising a spatial scan modulator, means to input the signal for the image into said spatial scan modulator,
said spatial scan modulator including a neighboring pixel means and a pixel fill calculator means, said neighboring pixel means providing a central element and a neighboring element to said pixel fill calculator means by delaying one or more of the elements of the image, said neighboring pixel means in addition delaying the input signal in order to make up for processing delays,
said pixel fill calculator means comparing the central element to a neighboring element in order to develop a fill signal including a vertical fill signal and a horizontal fill signal,
changing the size or shape of such central element and neighboring element in vertical and horizontal directions in response to said horizontal fill signal and vertical fill signal respectively so as to fill in the blank areas between such elements thus improving the apparent resolution of the image.

41. An apparatus for improving the apparent resolution of an image, said image being generated by elements, said apparatus comprising a neighboring pixel means, said neighboring pixel means developing a central and neighboring elements, a pixel fill calculator, said pixel fill calculator including a rank logic means and a fill logic means, means to pass said central and neighboring elements from said neighboring pixel means to said rank logic means, said rank logic means comparing said neighboring elements to determine the differences between said central and said neighboring elements and to rank said neighboring elements according to their similarity to said central element, said rank logic means providing the ranking of the neighboring elements to said fill logic means, and said fill logic means generating elements between the central element and the neighboring element by modulating such central and neighboring elements respectively in accord with the relative ranking of such neighboring elements in respect to the central element.

* * * * *

US005424780C1

(12) REEXAMINATION CERTIFICATE (4617th)
United States Patent
Cooper

(10) Number: US 5,424,780 C1
(45) Certificate Issued: Jul. 23, 2002

(54) APPARATUS AND METHOD FOR SPACIAL SCAN MODULATION OF A VIDEO DISPLAY

(75) Inventor: James C. Cooper, 1373 Sydney Dr., Sunnyvale, CA (US) 94087

(73) Assignee: James C. Cooper, Sunnyvale, CA (US)

Reexamination Request:
No. 90/005,414, Jul. 3, 1999
No. 90/005,484, Sep. 7, 1999

Reexamination Certificate for:
Patent No.: 5,424,780
Issued: Jun. 13, 1995
Appl. No.: 08/119,610
Filed: Sep. 13, 1993

Related U.S. Application Data

(63) Continuation of application No. 07/355,461, filed on May 22, 1989, now abandoned.

(51) Int. Cl.[7] ................................................ H04N 7/01
(52) U.S. Cl. ..................... 348/428.1; 348/458; 348/625
(58) Field of Search ............................... 348/428.1, 458, 348/615, 561, 581, 448, 443, 427, 626, 206

(56) References Cited

U.S. PATENT DOCUMENTS

| 2,921,128 A | 1/1960 | Gibson |
| 3,479,453 A | 11/1969 | Townsend |
| 3,573,789 A | 4/1971 | Sharp et al. ................. 340/324 |
| 3,680,076 A | 7/1972 | Duffek et al. |
| 3,718,833 A | 2/1973 | Martone et al. |
| 3,737,855 A | 6/1973 | Cutaia |
| 3,786,478 A | 1/1974 | King, Jr. |
| 3,788,478 A | 1/1974 | King, Jr. ..................... 340/324 |
| 3,878,536 A | 4/1975 | Gilliam |
| 3,921,164 A | 11/1975 | Anderson |
| 3,969,716 A | 7/1976 | Roberts |
| 3,980,819 A | 9/1976 | Schwartz ................. 178/7.5 R |
| 4,038,668 A | 7/1977 | Quarton |
| 4,063,232 A | 12/1977 | Fernald |

(List continued on next page.)

FOREIGN PATENT DOCUMENTS

FR  2269270  11/1975

OTHER PUBLICATIONS

J. M. Fleischer et al., "Laser Optical System of the IBM 3800 Printer", *IBM Journal of Res. Develop.*, Sep. 1977, pp. 479–483.
J. R. Kinghorn, "Character Rounding for Alphanumeric Video Display", *Mullard Technical Communications*, No. 126, Apr. 1975, pp. 230–239.
High Definition NTSC Broadcast Protocol by Richard J. Iredale.
Integrated Digital IDTV Receiver with Features by S. Naimpally, et al.
Character Rounding for Alphanumeric Video Display by J.R. Kinghorn.
High Resolution Display and Printing Technique by Y.L. Yao.
Behind Hewlett–Packard's Patent on Resolution Enhancement Technology J. Randolph Sanders et al.

*Primary Examiner*—Chris Grant

(57) ABSTRACT

An apparatus and method is shown for modifying the presentation of pixels displayed or printed on a raster or matrix image or graphic display or printer, thereby increasing the apparent image quality. Means for deriving a plurality of neighboring pixels of the video signal, and means for determining pixel modification in response thereto, are also shown. Particular embodiments relating to increasing the apparent temporal and spatial resolution of raster scanned television devices are shown.

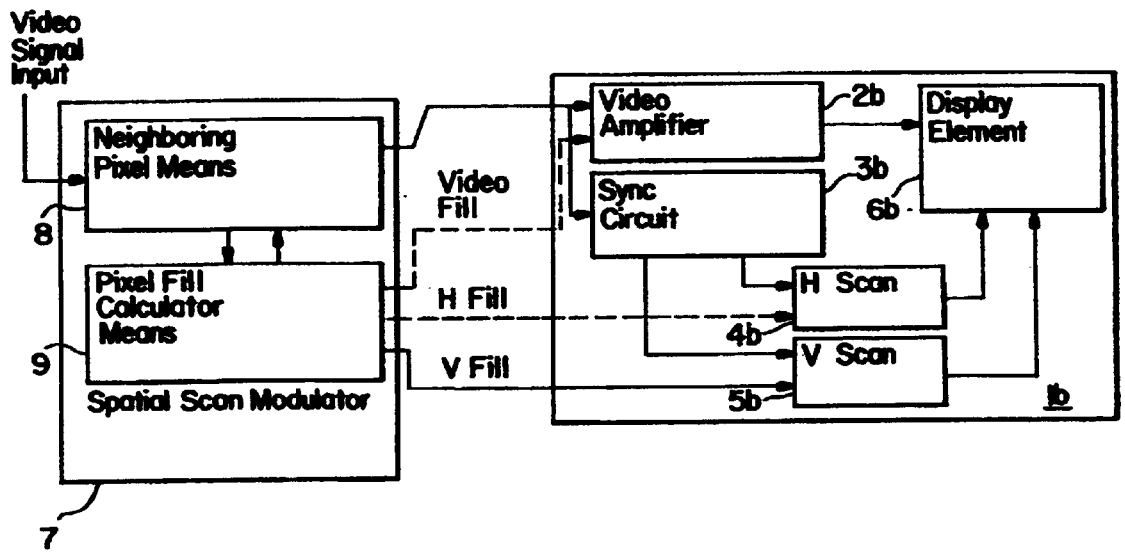

U.S. PATENT DOCUMENTS

| | | |
|---|---|---|
| 4,068,310 A | 1/1978 | Friauf |
| 4,079,367 A | 3/1978 | Yonezawa et al. |
| 4,095,216 A | 6/1978 | Spicer .................. 340/324 |
| 4,119,956 A | 10/1978 | Murray |
| 4,240,113 A | 12/1980 | Michael et al. |
| 4,282,546 A | 8/1981 | Reitmeier |
| 4,361,853 A | 11/1982 | Remy et al. |
| 4,364,090 A | 12/1982 | Wendland |
| 4,389,668 A | 6/1983 | Favreau |
| 4,419,693 A | 12/1983 | Wilkinson |
| 4,437,122 A | 3/1984 | Walsh et al. ............ 358/166 |
| 4,450,483 A | 5/1984 | Coviello ................ 358/166 |
| 4,460,909 A | 7/1984 | Bassetti et al. |
| 4,464,686 A | 8/1984 | Reitmeier |
| 4,484,230 A | 11/1984 | Pugsley |
| 4,506,382 A | 3/1985 | Hada et al. |
| 4,521,803 A | 6/1985 | Gittinger |
| 4,533,951 A | 8/1985 | Powers |
| 4,544,264 A | 10/1985 | Bassetti et al |
| 4,544,922 A | 10/1985 | Watanabe et al. ...... 340/728 |
| 4,573,070 A | 2/1986 | Cooper |
| 4,620,217 A | 10/1986 | Songer |
| 4,625,222 A | 11/1986 | Bassetti et al. |
| 4,656,514 A | 4/1987 | Wilkinson et al. |
| 4,661,850 A | 4/1987 | Strolle et al. |
| 4,673,978 A | 6/1987 | Dischert et al. |
| 4,675,735 A | 6/1987 | Wilkinson et al. |
| 4,677,493 A | 6/1987 | Shinya .................. 358/283 |
| 4,684,937 A | 8/1987 | Schine .................. 340/728 |
| 4,684,985 A | 8/1987 | Nakagaki et al. |
| 4,697,177 A | 9/1987 | Schine .................. 340/728 |
| 4,698,675 A | 10/1987 | Casey |
| 4,703,363 A | 10/1987 | Kitamura .............. 358/284 |
| 4,703,513 A | 10/1987 | Gennery |
| 4,715,006 A | 12/1987 | Nagata |
| 4,720,705 A | 1/1988 | Gupta et al. |
| 4,720,745 A | 1/1988 | DeForest et al. ........ 358/166 |
| 4,723,163 A | 2/1988 | Skinner |
| 4,761,819 A | 8/1988 | Denison et al. |
| 4,786,923 A | 11/1988 | Shimizu |
| 4,791,679 A | 12/1988 | Barski et al. |
| 4,805,226 A | 2/1989 | Guebey |
| 4,847,641 A | 7/1989 | Tung |
| 4,853,970 A | 8/1989 | Ott et al. |
| 4,933,689 A | 6/1990 | Yoknis |
| 4,941,045 A | 7/1990 | Birch |
| 4,952,921 A | 8/1990 | Mosier .................. 340/728 |
| 4,989,090 A | 1/1991 | Campbell et al. |
| 4,992,804 A | 2/1991 | Roe |
| 5,023,919 A * | 6/1991 | Wataya .................. 382/54 |
| 5,029,108 A | 7/1991 | Lung |
| 5,047,955 A | 9/1991 | Shope et al. |
| 5,068,914 A | 11/1991 | Klees .................... 382/54 |
| 5,365,604 A | 11/1994 | Kwok et al. |
| 5,408,329 A | 4/1995 | Mailloux et al. |
| 5,424,780 A | 6/1995 | Cooper |
| 5,442,407 A | 8/1995 | Iu |
| 5,544,264 A | 8/1996 | Bellegarda et al. |
| 5,563,963 A | 10/1996 | Kaplan et al. |

* cited by examiner

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–11, 15–20, 25 and 40–41 is confirmed.

Claims 12, 14, 21–24, 26–29, 32, and 34, 36 are determined to be patentable as amended.

Claims 13, 30, 31, 33, 35 and 37–39, dependent on an amended claim, are determined to be patentable.

New claims 42–149 are added and determined to be patentable.

12. [The improvement of claim 11] *An improvement for a scan device for displaying an image carried on a video signal, the image made up of a number of image elements,*
   *the improvement including in combination a neighboring pixel means responsive to said video signal to provide image elements including a central pixel and at least one neighboring pixel,*
   *a fill calculator means responsive to said central and neighboring pixels to determine the location of areas of said image being void between image elements,*
   *generating a fill signal operative to cause said scan device to perform spatial altering of the display including less than all spatial direction of said central pixel to fill the voids thereby improving the apparent resolution of the image without requiring an increase in the number of image elements originally making up the image,*
   wherein said fill signal causes the scanning of said scanned device to deviate from the normal scanning location for said central pixel thereby causing said central pixel to be displayed in [said fill] *the* areas of said image *being void*.

14. The device *of apparatus* of claim [1, 2, 3, 4,] 5, [6, 7, 8,] 9, 10, [11, 12] or 13 said device *or apparatus* including a scanning beam wherein the scanning of said beam is altered in response to some or all of said image elements of said signal carrying said image in order that areas of said displayed image, which would otherwise not be scanned, may be caused to be scanned in order to increase the apparent quality of said displayed image.

21. A method as claimed in claim 19 [or 20,] wherein the step of modifying includes changing the size of said central element to more closely match ones of said elements of said set of elements.

22. A method as claimed in claim 19 [or 20,] wherein the step of modifying includes reducing the size of said central element to display a portion thereof.

23. A method as claimed in claim 19 [or 20,] wherein the step of modifying includes changing the relative position of the display of said central element by altering the scanning thereof in response to said modification signal.

24. A method as claimed in claim 19 [or 20,] wherein the step of modifying includes changing the value of said central element to more closely match the values of some of said elements of said set of elements.

26. A method for improving the apparent resolution of an image, said method comprising examining a central element and one or more neighboring elements in order to determine the relationship therebetween,
   said central element and said neighboring elements having blank areas therebetween containing no substantive information, altering the [size or] shape of said central element in order to provide information for the blank areas between said central and neighboring elements, thus improving the apparent resolution of the image.

27. The method of claim 26 wherein the change in central element [size or] shape is accompanied by increasing the brightness of the beam creating such central element.

28. The method of claim 26 wherein the change in [size or] shape of said central element is accomplished by filling or dithering the scan that creates said central element at the appropriate time.

29. The method of claim 26 characterized in that the analysis of the relationship between the central element and said neighboring element develops a fill signal, which said central element having its [size or] shape modified in accord with such fill signal.

32. An apparatus for improving the apparent resolution of an image having a central element and one or more neighboring elements, there being blank areas therebetween,
   said apparatus including a means for determining the relationship between a central element and a neighboring element, and changing the [size or] shape of at least one element in response to said relationship so as to fill in the blank area between such central element and neighboring element.

34. The apparatus of claim 32 wherein the [size or] shape of said at least one element is altered by modifying the signal illumination for such element.

36. The apparatus of claim 34 wherein the elements are generated by a scan and wherein the signal illumination signal is modified by filling or dithering the scan at the appropriate time so as to alter the [size or] shape of said at least one element.

*42. The apparatus of claim 1 characterized in that said fill calculator means can cause shifts in the apparent center of an image element by altering the shape and/or position of image elements.*

*43. The apparatus of claim 42 characterized in that said apparent center can be shifted horizontally left and/or right.*

*44. The apparatus of claim 42 characterized in that said apparent center can be shifted vertically up and/or down.*

*45. The apparatus of claim 43 characterized in that said apparent center can be shifted vertically up and/or down.*

*46. The apparatus of claim 45 characterized in that said shifting can occur diagonally in combination to the upper right, lower right, lower left, and/or upper left.*

*47. The apparatus of claim 1 characterized in that said fill calculator means can cause an image element to be deviated from its normal scanning location.*

*48. The apparatus of claim 1 characterized in that said fill calculator means can change the shape of an image element.*

*49. The apparatus of claim 1 characterized in that said fill calculator means can alter voids by presenting an image element on a display device to increase the number of illuminated pixels from that provided by the signal.*

*50. The apparatus of claim 49 characterized in that said fill calculator means generates a fill pixel which is related to an image element provided by the signal.*

51. The apparatus of claim 50 characterized in that said fill pixel exists left and/or right of an image element provided by the signal.

52. The apparatus of claim 1 characterized in that said fill calculator means can cause dithering the signal.

53. The apparatus of claim 52 characterized in that said dithering can occur left and/or right.

54. The apparatus of claim 52 characterized in that said dithering can occur up and/or down.

55. The apparatus of claim 1 characterized in that said fill signal can include asymmetric modification of an image element.

56. The apparatus of claim 1 wherein the display device utilizes an image signal having color information for an image element and characterized in that said fill signal can determine if the image signal has related color information for an image element.

57. The apparatus of claim 1 characterized by the addition of relation means, and said relation means inspecting said image elements to determine the relation of said image elements.

58. The apparatus of claim 57 characterized in that said relation means considers color information.

59. The apparatus of claim 1 characterized in that the display device displays an image on a video monitor.

60. The apparatus of claim 1 characterized in that the void can be filled in part with portions of two image elements.

61. The apparatus of claim 8 characterized in that said fill calculator means can shift the apparent center of an image element by altering the shape and/or position of image elements.

62. The apparatus of claim 61 characterized in that said apparent center can be shitfed horizontally left and/or right.

63. The apparatus of claim 62 characterized in that said apparent center can be shifted vertically up and/or down.

64. The apparatus of claim 63 characterized in that said shifting can occur diagonally in combination to the upper right, lower right, lower left, and/or upper left.

65. The apparatus of claim 61 characterized in that said apparent center can be shifted vertically up and/or down.

66. The apparatus of claim 8 characterized in that said fill calculator means can cause an image element to be deviated from its normal scanning location.

67. The apparatus of claim 8 characterized in that said fill calculator means can cause changing the shape of an image element.

68. The apparatus of claim 8 characterized in that said fill calculator means can alter voids by causing the illumination of an image element on a display device to increase the number of illuminated pixels from that provided by the signal.

69. The apparatus of claim 68 characterized in that said fill calculator means causes presentation of a fill pixel which is related to an image element provided by the signal.

70. The apparatus of claim 69 characterized in that said fill pixel exists left and/or right of an image element provided by the signal.

71. The apparatus of claim 8 characterized in that said fill calculator means can cause dithering the signal.

72. The apparatus of claim 71 characterized in that said dithering can occur left and/or right.

73. The apparatus of claim 71 characterized in that said dithering can occur up and/or down.

74. The apparatus of claim 8 characterized in that said fill signal can include asymmetric modification of an image element.

75. The apparatus of claim 8 wherein the display device utilizes an image signal having color information for an image element and characterized in that the device can determine if the image signal has related color information for an image element.

76. The apparatus of claim 8 characterized by the addition of relation means, and said relation means inspecting said image elements to determine the relation of said image elements.

77. The apparatus of claim 76 characterized in that said relation means considers color information.

78. The apparatus of claim 8 characterized in that the image is displayed on a video monitor.

79. The apparatus of claim 8 characterized in that the void can include at least in part a portion of a space occupied by another image element.

80. The improvement of claim 11 wherein the display of the image is on a device having an image element display capacity with voids relative to the number of image elements of the image carried by the signal and characterized in that said fill calculator means can present a fill signal to generate additional pixels in the signal to fill the voids relative to image elements for display.

81. The improvement of claim 80 characterized in that the number of image elements presented on the display is greater than that input on the signal.

82. The improvement of claim 80 characterized in that said fill signal can produce different image elements and/or image portions that are not otherwise present in the signal.

83. The apparatus of claim 11 characterized in that said fill calculator means can shift the apparent center of an image element by altering the shape and/or position of image elements.

84. The apparatus of claim 83 characterized in that said apparent center can be shifted horizontally left and/or right.

85. The apparatus of claim 11 characterized in that said fill calculator means can cause an image element to be deviated from its normal scanning location.

86. The apparatus of claim 11 characterized in that said fill calculator means can cause a change in the shape of an image element.

87. The apparatus of claim 11 characterized in that said fill calculator means can cause dithering the signal.

88. The apparatus of claim 87 characterized in that said dithering can occur left and/or right.

89. The apparatus of claim 11 characterized in that said fill signal can include asymmetric modification of an image element.

90. The apparatus of claim 11 wherein the display device utilizes an image signal having color information for an image element and characterized in that said fill signal can determine if the image signal has related color information for an image element.

91. The apparatus of claim 11 characterized by the addition of relation means, and said relation means inspecting said image elements to determine the relation of said image elements.

92. The apparatus of claim 91 characterized in that said relation means considers color information.

93. The apparatus of claim 11 characterized in that the image is displayed on a video monitor.

94. The apparatus of claim 11 characterized in the void can be filled in part with portions of two image elements.

95. The scan device or apparatus of claim 1, 2, 3, 4, 6, 7, 8, 11 or 12 said scan device or apparatus including a scanning beam wherein the scanning of said beam is altered in response to some or all of said image elements of said signal carrying said image in order that areas of said displayed image, which would otherwise not be scanned, may be caused to be scanned in order to increase the apparent quality of said displayed image.

96. The method of claim 15 wherein the display of the image is on a device having an image element display with voids between image elements of the image carried by the signal and characterized in that said altering step can present a fill signal that causes illumination of additional pixels to occur to fill the voids between image elements for display.

97. The method of claim 96 characterized in that the number of image elements presented on the display is greater than that input on the signal.

98. The method of claim 96 characterized in that said fill signal can produce different image elements and/or image portions that are not otherwise present in the signal.

99. The method of claim 15 characterized in that said altering step can cause shifts of the apparent center of an image element by altering the shape and/or position of image elements.

100. The method of claim 99 characterized in that said apparent center can be shifted horizontally left and/or right.

101. The method of claim 15 characterized in that said altering step can cause an image element to be deviated from its normal scanning location.

102. The method of claim 15 characterized in that said altering step can cause changes to the shape of an image element.

103. The method of claim 15 characterized in that said altering step can cause dithering the signal.

104. The method of claim 103 characterized in that said dithering can occur left and/or right.

105. The method of claim 15 characterized in that said altering can include the asymmetric altering of an image element.

106. The method of claim 15 wherein the display device utilizes an image signal having color information for an image element and characterized in that said altering can determine if the image signal has related color information for an image element.

107. The method of claim 15 characterized by the addition of inspecting said image elements to determine the relation of said image elements.

108. The method of claim 107 characterized in that said inspecting of said image element considers color information.

109. The method of claim 15 characterized in that the image display device is a video monitor.

110. The method of claim 15 characterized in that the void can include at least in part a portion of a space occupied by another image element.

111. A method as claimed in claim 19 wherein the value of said central element is changed to a value between the values of two of said elements of said set.

112. The method of claim 22 characterized by the addition of inspecting said image elements to determine if said image elements are related.

113. The method of claim 112 characterized in that said inspecting of said image elements considers color information.

114. The method of claim 20 characterized in that said modifying the display can include shifting the apparent center of said central element by altering the shape and/or position of image elements.

115. The method of claim 114 characterized in that said apparent center of said central element can be shifted horizontally left and/or right.

116. The method of claim 20 characterized in that said modifying the display can include modifying the shape of said central element.

117. The method of claim 20 wherein the display has voids relative to image elements on an input signal thereto and characterized in that said modifying means can illuminate an increased number of image elements to fill the voids relative to the image elements on the input signal.

118. The method of claim 117 characterized in that the displayed image elements can be present to the left and/or right of the normal location of said central element.

119. The method of claim 20 characterized in that said modifying the display can include dithering the signal.

120. The method of claim 20 characterized in that said dithering can occur left and/or right.

121. The method of claim 20 characterized in that said modifying the display of said central element can cause asymmetric display of said central element.

122. The method of claim 20 wherein the display device utilizes an image signal having color information for an image element and characterized in that said modifying the display of said central element can determine if the image signal has related color information for said central element.

123. The method of claim 20 characterized by the addition of inspecting said image elements to determine the relation of said image elements.

124. The method of claim 123 characterized in that said inspecting of said image elements considers color information.

125. The method of claim 20 characterized in that the display apparatus is a video monitor.

126. The method of claim 20 characterized in that modifying the display can cause a void to be filled in part with portions of two image elements.

127. The method of claim 26 characterized in that said altering the shape of said central element can cause asymmetric altering of said central element.

128. The method of claim 26 wherein the display device utilizes an image signal having color information for an image element and characterized in that said altering the shape of said central element can determine if the image signal has related color information for said central element.

129. The method of claim 26 characterized by the addition of inspecting said image elements is determine if said image elements are related.

130. The method of claim 129 characterized in that said inspecting said image elements considers color information.

131. The method of claim 26 characterized in that the image is on a video monitor.

132. The method of claim 26 characterized in that modifying the display can cause a void to be filled in part with portions of two image elements.

133. The apparatus of claim 32 wherein the blank areas are due to the display in a first illumination of the image on a device showing voids in a different illumination relative to the image elements carried by the signal and characterized in that said means can present a fill signal that provides a differing number of first illumination image elements for display.

134. The apparatus of claim 133 characterized in that the number of image elements presented on the display is greater than that input on the signal.

135. The apparatus of claim 133 characterized in that said means for changing the shape of at least one element can include generating fill image elements in blank areas of the display.

136. The apparatus of claim 133 characterized in that said fill signal can provide image elements that are otherwise not present in the signal.

137. The apparatus of claim 32 characterized in that said means for changing the shape of at least one element can include shifting the apparent position of said at least one element.

138. The apparatus of claim 137 characterized in that said apparent position can be shifted horizontally left and/or right.

139. The apparatus of claim 32 characterized in that said means for changing the shape of at least one element can include means to cause said at least one element to move from its normal scanning location.

140. The apparatus of claim 32 characterized in that said means for changing the shape of at least one element can change only the shape of said at least one element.

141. The apparatus of claim 32 characterized in that said changing the shape of at least one element can cause asymmetric change to such element.

142. The apparatus of claim 32 wherein the display device utilizes an image signal having color information for an image element and characterized in that said changing the shape of at least one element can determine if the image signal has related color information for such element.

143. The apparatus of claim 32 characterized in that the image is displayed on a video monitor.

144. The apparatus of claim 32 characterized in that modifying the display can cause a void to be filled in part with portions of two image elements.

145. Apparatus for improving the apparent resolution of an image displayed by a display device, the image made up of a number of image elements, including in combination, a neighboring pixel means responsive to a signal which carries said image to provide a plurality of image elements, and a fill calculator means responsive to said plurality of image elements to generate a fill signal indicating where said display device may alter voids between said image elements which can include moving image elements for improving the apparent resolution of the image without requiring an increase in the number of image elements originally making up the image.

146. Apparatus for improving the image quality of a displayed image, the image made up of a number of image elements carried by a signal, the apparatus including in combination, a neighboring pixel means responsive to the signal carrying said displayed image to provide a plurality of image elements including a central pixel and a plurality of neighboring pixels and a fill calculator means responsive to said central and neighboring pixels to generate a fill signal indicating voids in said displayed image which may be filled which filling can include movement of image elements, which said displayed image is displayed by a display device thereby improving the apparent resolution of the image without requiring an increase in the number of image elements originally making up the image.

147. An improvement for a scan device for displaying an image carried on a video signal, the image made up of a number of image elements, the improvement including in combination, a neighboring pixel means responsive to said video signal to provide image elements including a central pixel and at least one neighboring pixel, a fill calculator means responsive to said central and neighboring pixels to determine the location of areas of said image being void between image elements and generating a fill signal operative to cause said scan device to perform spatial altering of the display of said central pixel which spatial altering can include the movement thereof to fill the voids thereby improving the apparent resolution of the image without requiring an increase in the number of image elements originally making up the image.

148. A method of improving the quality of an image which may be displayed on an image display device, the image made up of a number of image elements, including the step of selecting a plurality of pixels of said image, the step of comparing a first of said selected pixels to at least a second of said selected pixels to select voids of said image to be altered and including the further step of altering voids in said image which altering can include movement of a pixel in response to said comparing step thereby improving the apparent resolution of the image without requiring an increase in the number of image elements originally making up the image.

149. A method of enhancing the display of an image by a display apparatus, the image made up of a number of image elements, which display includes scanning a raster, said raster including raster lines, said raster lines including elements which include elements having binary illumination conditions such as in a computer display, said method including the steps of:

storing in temporary storage means a known number of said elements of a known number of said raster lines to form a set of said elements;

generating a central element representative of the central area of said set of elements;

generating a modification signal in response to said set of elements; and modifying the display of said central element by moving said central element in response to said modification signal to improve its spatial resolution relationship with its neighboring elements thereby improving the apparent resolution of the image without requiring an increase in the number of image elements originally making up the image.

* * * * *